S. M. DICK.
LOCKING DEVICE FOR AUTOMOBILES.
APPLICATION FILED OCT. 28, 1915.
1,207,877.
Patented Dec. 12, 1916.
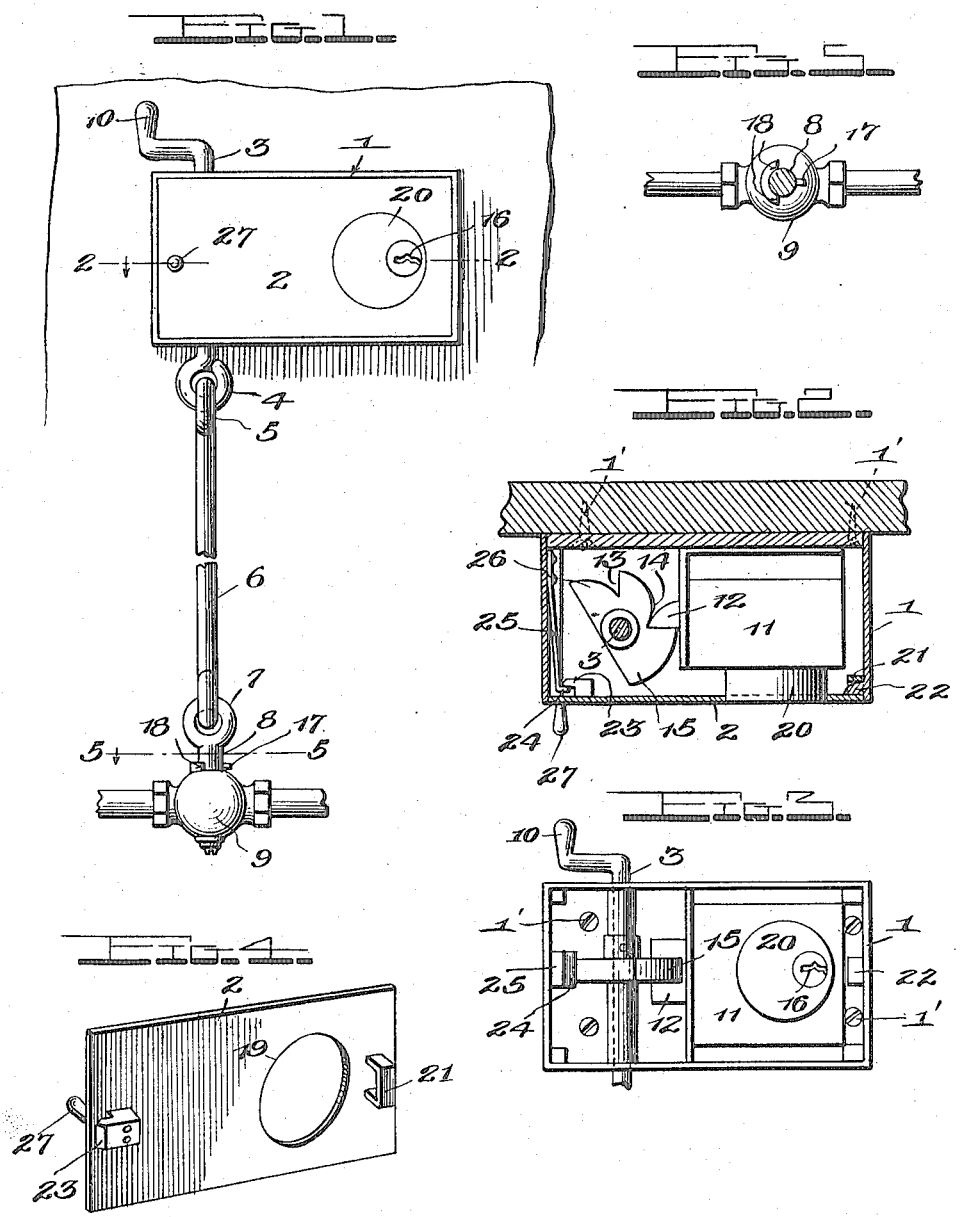
Inventor
Samuel M. Dick,
Witnesses
Chas. L. Grieshauer.
By H. B. Willson & Co.
Attorneys

UNITED STATES PATENT OFFICE.

SAMUEL M. DICK, OF MINNEAPOLIS, MINNESOTA.

LOCKING DEVICE FOR AUTOMOBILES.

1,207,877.  Specification of Letters Patent.  Patented Dec. 12, 1916.

Application filed October 28, 1915. Serial No. 58,408.

*To all whom it may concern:*

Be it known that I, SAMUEL M. DICK, citizen of the United States, residing at Minneapolis, in the county of Hennepin and State of Minnesota, have invented certain new and useful Improvements in Locking Devices for Automobiles; and I do declare the following to be a full, clear, and exact description of the invention, such as will enable others skilled in the art to which it appertains to make and use the same.

This invention relates to improvements in devices used for locking motor vehicles, particularly that type of device which is designed to cut off the flow of gasolene or other liquid fuel to the carbureter, thus preventing the operation of the engine of the vehicle.

A further object is to provide a simply constructed device which may be contained in a small housing and operated by an ordinary form of lock such as those of the Yale or Corbin type.

A further object is to provide a housing, the cover of which is normally locked in place but which is readily opened by means of a valve operating mechanism therein.

With the above and other objects in view, my invention resides in certain novel features of construction, combination and arrangement of parts as will be hereinafter more fully described and claimed, and shown in the drawings wherein:

Figure 1 represents a front elevation of my invention showing the same applied; Fig. 2 is a horizontal section on the line 2—2 of Fig. 1; Fig. 3 is a front elevation of the device with the cover of the housing thereof removed; Fig. 4 is a detail perspective view of the inner face of the cover plate of the housing; Fig. 5 is a detail horizontal section on the line 5—5 of Fig. 1.

In its preferred form as shown in the drawings, my invention comprises a housing or casing 1 which is provided with a suitable cover plate 2, and is secured to a convenient portion of an automobile by the fastening screws 1' which are inserted through the back of the casing from the interior thereof and into the support as best disclosed in Fig. 2. This cover plate 2 is normally locked thereby securing the casing to the automobile and preventing the operation of the valve which controls the flow of gasolene, and which is about to be described. An operating shaft 3 is provided on its lower end with an eye 4 and is adapted to extend upwardly through the top and bottom of the casing, the eye 4 being adapted to coact with a similar eye 5 formed on the upper end of a connecting rod 6, the lower end of which engages an additional eye 7 formed on a plug 8 of any suitable or preferred form of valve 9. By turning a suitable handle 10 formed on the upper end of the operating shaft 3, the valve 9 may be opened or closed, depending upon the direction of movement of the handle 10. The valve 9 is placed in a pipe which connects the supply tank of the automobile with the carbureter, connection between this pipe and the valve 9 being of any preferred means.

For locking the operating shaft which controls the operation of the valve 9, I provide within the casing 1, a suitable lock 11, preferably of the Corbin or Yale type, the bolt 12 of which is adapted to coact with either one of two notches 13 and 14 formed in the edges of a stop plate 15 carried by the operating shaft 3. The stop plate is keyed or otherwise fixed to the shaft 3 and therefore rotates when the handle 10 is moved. When the parts are disposed as shown in Fig. 2, the stop cock or valve 9 is open, which allows the fuel to flow from the supply tank, generally beneath the front seat of the automobile, to the carbureter. It is obvious that the casing 1 containing the locking means is located above the supply pipe passing from the tank to the carbureter, and is secured either to the dash board or directly behind the driver's legs on the front of the front seat. When, however, the stop 15 is moved toward the right until the lock bolt 12 coacts with the notch 13, the valve 9 is closed and is prevented from opening until the lock bolt is withdrawn by means of a suitable key inserted in the key hole 16. It will be seen that the stop plate is prevented from being turned toward the left and thus opening the valve because of the lock bolt, and prevented from turning farther toward the right by means of the usual stud 17 carried by the plug 8 of the valve abutting the shoulder 18 formed on the casing of said valve. When the valve has been locked in closed position, it can be only opened by again withdrawing the lock bolt and rotating the stop plate until it assumes the position shown in the drawings.

As hereinbefore stated, the cover plate 2 of the casing is normally locked, thus preventing any one from tampering with the valve locking mechanism within the casing. This cover plate is provided with an aperture 19 adapted to receive an outwardly projecting rounded portion 20 of the lock 11, and is further provided on its rear face adjacent one end with a loop 21 adapted to coact with an inwardly projecting lug 22 formed on the inner wall of one of the ends of the casing 1. The cover plate is also provided on its rear face adjacent the opposite end with a hook-like finger 23, which together with the loop 21, forms a part of the locking means for the cover plate. This finger 23 coacts with the hooked end 24 of a flat leaf spring 25 secured by one end to the inner face of one end of the casing. It is evident that when the cover plate is in position on the casing, with the loop 21 coacting with a projection 22 and with the finger 23 beneath the hooked end 24, said plate cannot be removed until the spring 25 is forced outwardly against the end of the casing. This spring can only be forced outwardly in this position to unlock the cover plate by the stop plate 15, which, when the lock bolt 12 has been withdrawn, can be turned toward the left until the cam 26 formed on said stop plate contacts with the spring 25 to force the same outwardly. When the stop plate 15 has been moved to this position, the hooked end 24 will be withdrawn and the adjacent end of the cover plate can be lifted outwardly by the handle 27, and then removed entirely, this continued outward movement of the cover plate releasing the loop 21 from its projection 22. In replacing the cover, the spring 25 must again be retracted in the same manner as when removing the cover, the loop 21 being inserted in position beneath the projection 22 and the opposite end of the cover forced inwardly, the same being locked when the stop plate is moved to release the spring.

From the foregoing description, it will be seen that when the device is locked, the lock bolt must be withdrawn before the valve can be opened by movement of the stop plate toward the left, and that continued movement of the stop plate will retract the spring 25 and allow the cover plate 2 to be removed. It is also evident that while this locking device is extremely simple in construction, it will also be very efficient in operation and will prevent a theft of any motor vehicle upon which it is applied.

I claim as my invention:

1. The combination with a valve; of a casing, a cover therefor, means for locking said cover in closed position, an operating shaft extending through said casing, said shaft being rotatable to release said locking means to permit removal of said cover, and a connection between said shaft and the valve, said valve being opened without releasing said locking means by rotation of said shaft.

2. The combination with a valve; of a casing, a cover therefor, a leaf spring secured to said casing, a finger on said cover to coact with said spring to hold the same in locked position, an operating shaft extending through said casing, a stop plate fixed on said shaft, a lock for holding said plate in predetermined positions, said stop plate being rotatable by said shaft when the lock is released to engage and retract said spring, thereby permitting the cover to be removed, and a connection between said shaft and the valve, said valve being opened by rotation of the shaft.

3. In a locking device of the class described, a casing, a cover therefor, a leaf spring secured to said casing, a finger on said cover to coact with said spring to hold the same in locked position, an operating shaft extending through said casing and adapted to be connected with a valve, a stop plate fixed on said shaft, and a lock for holding said plate in predetermined positions, said plate being rotatable by said shaft when the lock is released, to engage and retract said spring, thereby permitting the cover to be removed, said valve being opened by rotation of the shaft.

4. The combination with a valve, of a casing, a cover therefor, fastening elements on the interior of said casing for securing the same to a support, an operating shaft extending transversely through said casing, a connection between said shaft and the valve, a stop plate fixed to said shaft, and having a pair of notches in its edge, a lock having its bolt adapted for coaction with said notches to hold said plate in predetermined positions, a leaf spring secured to said casing, a finger on the inner face of one end of said cover for holding the same in the casing, and a connection between the cover plate and the casing, whereby said cover prevents tampering with the mechanism within the casing, said cover plate being unlocked by rotation of the stop plate, said valve being opened by rotation of the stop.

In testimony whereof I have hereunto set my hand in presence of two subscribing witnesses.

SAMUEL M. DICK.

Witnesses:
A. H. MAAS,
PERRY STARKWEATHER.

Copies of this patent may be obtained for five cents each, by addressing the "Commissioner of Patents, Washington, D. C."